United States Patent
Fortin et al.

(10) Patent No.: US 6,716,148 B1
(45) Date of Patent: Apr. 6, 2004

(54) METAL-SLEEVED CARBON FIBER ANILOX ROLLER BASE

(75) Inventors: Mark B. Fortin, Hopkinton, MA (US); William H. Gardner, Raynham, MA (US)

(73) Assignee: Double E Co., Inc., W. Bridgewater, MA (US)

( * ) Notice: Subject to any disclaimer, the term of this patent is extended or adjusted under 35 U.S.C. 154(b) by 0 days.

(21) Appl. No.: 10/195,252

(22) Filed: Jul. 15, 2002

Related U.S. Application Data

(60) Provisional application No. 60/306,089, filed on Jul. 17, 2001.

(51) Int. Cl.[7] ............................................. F16C 13/00
(52) U.S. Cl. ..................... 492/47; 492/50; 29/895.22
(58) Field of Search ........................ 492/47, 50, 54; 29/895.212, 895.22, 895.23; 72/238, 239; 464/184

(56) References Cited

U.S. PATENT DOCUMENTS

| | | | |
|---|---|---|---|
| 5,061,533 A | * 10/1991 | Gomi et al. | .................. 492/50 |
| 5,840,386 A | * 11/1998 | Hatch et al. | .................. 492/47 |
| 5,857,950 A | 1/1999 | Hycner | |
| 6,240,639 B1 | 6/2001 | Hycner | |

* cited by examiner

Primary Examiner—Peter Vo
Assistant Examiner—Marc Jimenez
(74) Attorney, Agent, or Firm—John P. McGonagle

(57) ABSTRACT

An anilox roller base comprised of a carbon fiber composite cylinder over which a metal sleeve is fitted. Metal journals, journal headers, or end caps are installed in the anilox roller base ends. A ceramic coating is added to the metal sleeve external surface and subsequently machined to the precise dimensions required of an anilox roller.

9 Claims, 3 Drawing Sheets

METAL-SLEEVED CARBON FIBER ANILOX ROLLER BASE

RELATED U.S. APPLICATION DATA

This application claims the benefit of Provisional Application No. 60/306,089, filed Jul. 17, 2001.

BACKGROUND OF THE INVENTION

This invention relates to fluid metering rolls, and in particular, to anilox rollers used in printing processes.

Anilox rollers are fluid metering rollers and are used in printing presses and have the function of precisely metering the amount of ink that is deposited onto a printing plate printing roller, or the like. The anilox roller has an exterior surface formed with outward opening metering cells. The anilox roller picks up liquid ink from an ink source and deposits the ink on a printing plate, printing roller, or the like, in discrete increments, the quantity deposited by each cell being controlled within precise tolerances across the entire surface of the printing plate, printing roller, or the like. This result is affected by the anilox roller having a multiplicity of closely-spaced, i.e., up to 1,000 or more, cells per lineal inch, the cells having virtually identical volumetric capacities.

Anilox rollers have been in use for many years. A typical anilox roller is comprised of a cylindrical metal body (usually steel) and rigidly fixed journals (typically, welded or shrink fit construction) through which the roller is mounted on bearings or a drive system. The surface of the metal roller is then modified to contain many (millions) of very small cells in which ink can be retained. The cells are typically made by either mechanically engraving the roller or by coating the metal roller with ceramic and engraving the cells with a laser. Metal rollers have many characteristics which are undesirable. These characteristics include heavy weight and high rotating inertia. They also exhibit poor vibration attenuation.

As an alternative to metal anilox rollers, some companies have manufactured anilox rollers using a carbon fiber reinforced composite material rather than metal as the roller body. Examples of this may be seen in U.S. Pat. Nos. 6,240,639 and 5,857,950. An anilox roller made out of a carbon fiber reinforced composite typically weighs substantially less (up to 50% less) and has a lower rotating inertia (up to 80% less) than its metal equivalent. A carbon fiber anilox roller is typically made by coating a carbon fiber roller body with ceramic and subsequently laser engraving the surface.

Although typical carbon fiber anilox rollers provide rollers that weigh considerably less than and have a considerably lower rotating inertia than their metal counterparts, they do have their own significant disadvantages. Carbon fiber anilox rollers typically do not last as long as their steel counterparts. The bond between the ceramic coating and the composite roller body is generally not as strong as that between a ceramic coating and a metal body. Consequently, the ceramic coating on a carbon fiber anilox base is known to prematurely flake off. Carbon fiber anilox rollers also cost two to three times as much as metal anilox rollers. Both metal and carbon fiber anilox rollers can only be refinished (reground and recoated) a limited number of times, typically two to five times.

Due to the corrosive nature of chemicals that are employed in the printing process and the anilox roller cleaning process, anilox rollers generally require refurbishing after extended period of use. Refurbishment of a metal anilox roller generally involves grinding off the ceramic coating or engraving surface and a small amount of metal below the coating in order to obtain a new, clean surface. Refurbishment of a prior art carbon fiber anilox roller involves stripping of the ceramic coating by various means and removal of a small layer of carbon fiber composite in order to obtain a new, clean surface. Metal anilox rollers can generally be refurbished about three times before they must be discarded. Carbon fiber anilox rollers can, in general, be refurbished more times than metal anilox rollers, but the number of times they can be refurbished is still very limited.

SUMMARY OF THE INVENTION

The present invention addresses the problem of prior art anilox rollers by providing a metal-sleeved carbon fiber anilox roller base which is a hybrid between the prior art metal anilox roller base and the prior art carbon fiber anilox roller base. The present invention is an improvement over both technologies. The present invention is comprised of a carbon fiber composite cylinder over which a metal sleeve is fitted. Metal journals, journal headers, or end caps are installed into the invention ends. A ceramic coating is then typically added to the metal sleeve external surface. The sleeve is subsequently machined to the precise dimensions required of an anilox roller.

The metal-sleeved carbon fiber anilox roller combines the light weight and low inertia characteristics of the carbon fiber anilox roller base with the durability and ease of processing of the metal anilox roller base. The metal-sleeved carbon fiber anilox roller can be made into an anilox roller by any of the dozens of companies that manufacture metal anilox rollers from metal anilox roller bases. No change in processing is required. The ceramic coating adheres as well to the metal-sleeved roller base as it does to a standard metal anilox roller base. The present invention allows any company that manufactures metal anilox rollers to now participate in the lightweight, low inertia anilox roller market, and provides a unique solution to the problem of poor adherence between carbon fiber composites and ceramic coatings.

Refurbishment of a metal-sleeved anilox roller is carried out via the same means used for a metal anilox roller. After several refurbishments, the remaining sleeve material becomes too thin to grind effectively. When the sleeve material becomes too thin to regrind, the sleeve is removed and a new sleeve is installed saving considerable cost over a replacement roller, be it metal or carbon fiber composite. The resulting refurbished roller is generally indistinguishable from the original anilox roller. Replacement of the metal sleeve thereby permits an unlimited number of refurbishments of a metal-sleeved carbon fiber anilox roller. This provides an additional advantage of the present invention over prior art anilox rollers because the cost of resleeving is less than the cost of a new metal roller base or a carbon fiber anilox roller base.

These together with other objects of the invention, along with various features of novelty which characterize the invention, are pointed out with particularity in this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
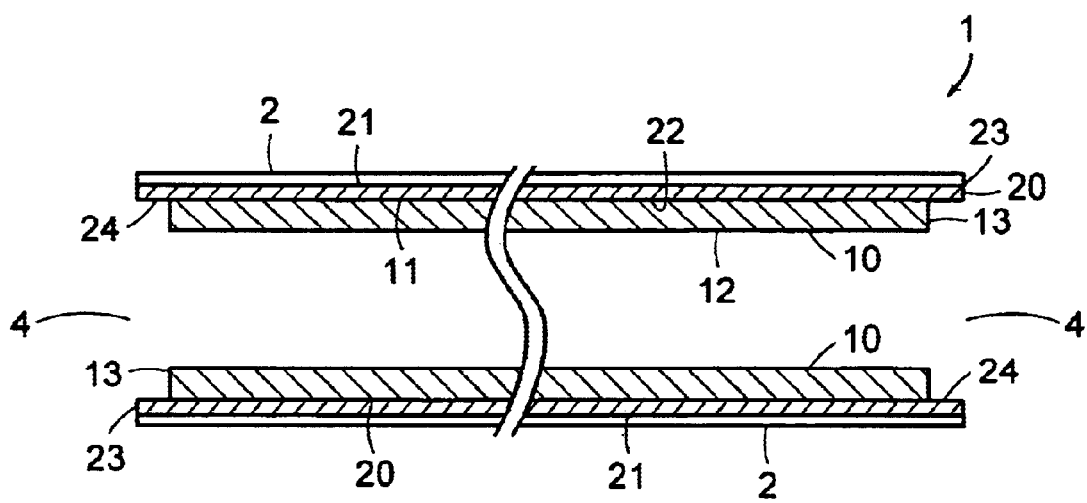
FIG. 1 is a side, cross-sectional view of the invention.
Figure 2:
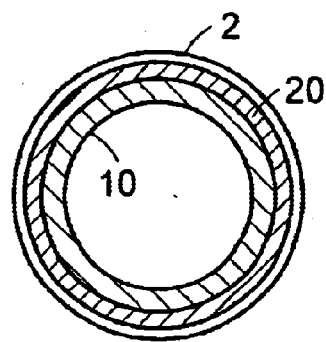
FIG. 2 is an end view thereof.
Figure 3:
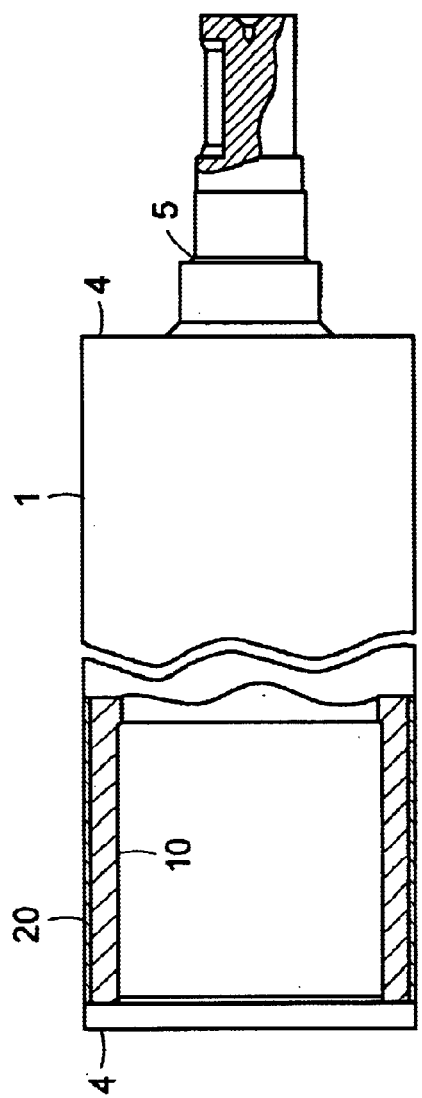
FIG. 3 is a close up side sectional view with a journal.
Figure 3:
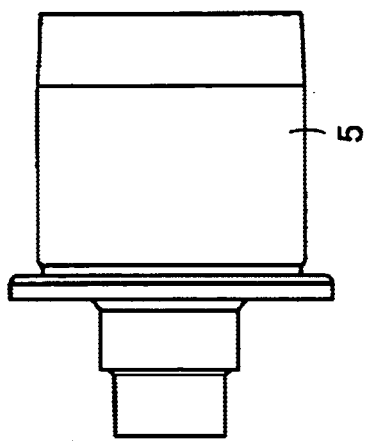

Referring to the drawings in detail wherein like elements are indicated by like numerals, there is shown an anilox roller 1 constructed according to the invention. The invention 1 is comprised of a hollow carbon fiber tube 10 over which a metal sleeve 20 is joined. The metal sleeve has an external surface 21 and an interior surface 22. The metal sleeve exterior surface 21 is adapted for anilox machining or to being coated with a ceramic 2 adapted for anilox machining. While the metal sleeve 20 can be virtually any thickness, a thickness in the range of 0.05 inches to 0.20 inches works best, with a preferred thickness of between 0.10 and 0.14 inches. The metal sleeve 20 is preferably made from steel or aluminum, but may also be made from stainless steel or titanium.

The joining of the metal sleeve 20 to the carbon fiber tube 10 must be done carefully to avoid slippage between the metal sleeve and the carbon fiber tube. Joining may be done mechanically, by shrink fitting, or by adhesive bonding. Mechanical joining is the least expensive but provides the poorest operating characteristics. Shrink fitting the metal sleeve to the carbon fiber tube provides the best operating characteristics, but is the most expensive process. Adhesive bonding of the metal sleeve to the carbon fiber tube is a compromise between mechanical and shrink fitting joining and provides a middle ground between cost and operating characteristics.

In general, the ceramic coating 2 process used on newer anilox rollers is a thermal process and causes the temperature of the roller base 1 to increase considerably during coating. The temperature of the roller base 1 may reach 150° F. or greater. In general, the thermal expansion coefficient of carbon fiber composite as implemented in a roller base is considerably less than that of most metals. The preferred embodiment of this invention contains a feature that accommodates this differential thermal expansion by incorporating an expansion joint 3 as depicted in FIGS. 4–6.

Figure 5:
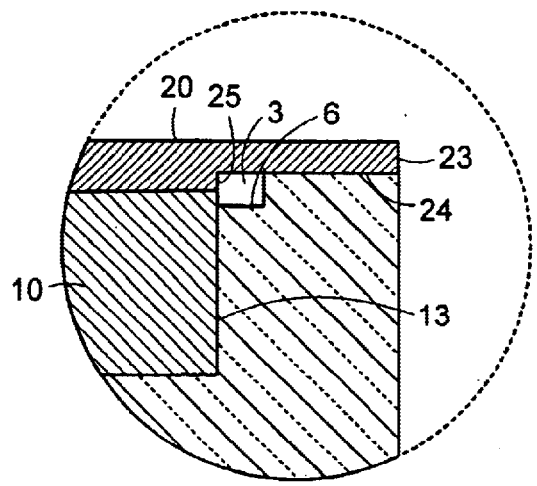
FIG. 5 is a close up view of the thermal expansion joint at ambient temperatures.
Figure 6:
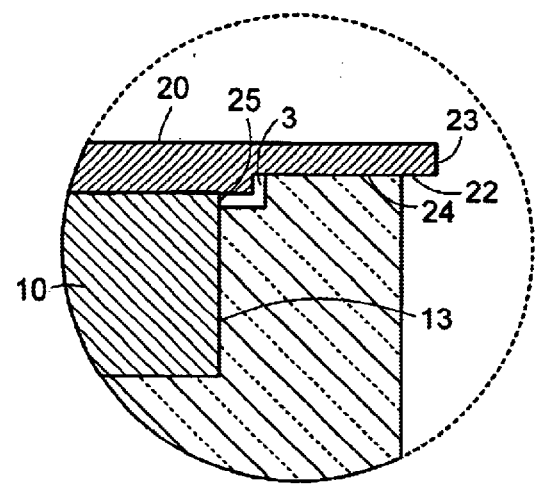
FIG. 6 is a close up view of the thermal expansion joint at elevated temperatures.
Figure 4:
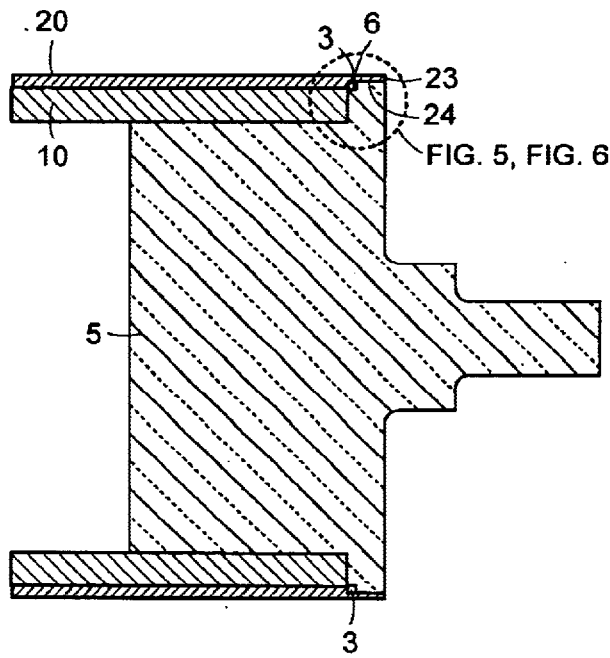
FIG. 4 is a close up sectional view of one end of the invention.

Referring more particularly to FIGS. 4–6, there is shown an anilox roller end 4 comprised of a carbon fiber tube end 13 and metal sleeve end 23. As may be best seen in FIG. 4, the metal sleeve interior surface 22 is joined to a carbon fiber tube exterior surface 11. The carbon fiber tube end 13 terminates before the metal sleeve end 23. The metal sleeve interior surface portion 24 not engaged by said carbon fiber tube exterior surface 11 is chamfered for engagement by a metal journal/header/end cap 5 inserted into the roller end 4 engaging a portion of the carbon fiber tube interior surface 12, the carbon fiber tube end 13, and the portion 24 of the metal sleeve interior surface 22 not engaged by said carbon fiber tube exterior surface 11. The metal journal/header/end cap 5 is glued to the carbon fiber tube 10. The metal journal/header/end cap 5 may also be mechanically fastened or shrunk fit to the carbon fiber tube 10. The metal journal/header/end cap 5 is generally shaped to conform to the shape of the roller end 4. An expansion joint 3 is formed by notching about the circumferential perimeter 6 of the metal journal/header/end cap 5 where the metal journal/header meets the carbon fiber tube end 13 and beginning of the metal sleeve interior surface chamfer 25. The thermal expansion joint 3 permits unrestrained expansion of the metal sleeve 20 during the coating process, leaving the metal journals, journal headers, or end caps unaffected. See FIG. 6. Upon cooling, the sleeve reverts to its original length. See FIG. 5. Omission of a thermal expansion joint causes the metal sleeve 20 to unseat the journal/header/end cap 5 from its position in the roller end 4. In such case, upon cooling, the journal/header/end cap 5 would remain removed from the roller body end 4 rendering the assembly useless.

It is understood that the above-described embodiment is merely illustrative of the application. Other embodiments may be readily devised by those skilled in the art which will embody the principles of the invention and fall within the spirit and scope thereof.

We claim:

1. An anilox roller body having two ends, said body adapted to being joined with grasping devices from a group comprised of journals, headers and end caps inserted into said ends, comprising:
    a hollow carbon fiber tube having an exterior surface, an interior surface, and two opposite ends;
    a metal sleeve having an external surface, an interior surface, and two opposite ends, said sleeve being positioned over and joined to said carbon fiber tube, wherein said metal sleeve interior surface abuts said carbon fiber tube exterior surface, said metal sleeve exterior surface being adapted for anilox machining;
    an expansion joint comprising:
        each carbon fiber tube end terminating before each metal sleeve end;
        a metal sleeve interior surface portion at each end not engaged by said carbon fiber tube exterior surface, each said portion being chamfered for engagement by a said grasping device inserted into each roller body end and engaging a portion of the carbon fiber tube interior surface, a said carbon fiber tube end, and a said portion of the metal sleeve interior surface;
        wherein each said grasping device has a notch about a circumferential perimeter where the grasping device meets the carbon fiber tube end and a beginning of the metal sleeve interior surface chamfer.

2. An anilox roller body as recited in claim 1, wherein:
the metal sleeve has a thickness in the range of 0.05 inches to 0.2 inches.

3. An anilox roller body as recited in claim 2, wherein:
the metal sleeve is made from metal from a group comprised of steel, stainless steel, aluminum, and titanium.

4. An anilox roller body as recited in claim 3, wherein:
the metal sleeve is mechanically joined to the carbon fiber tube.

5. An anilox roller body as recited in claim 4, wherein:
said metal sleeve external surface is coated with a ceramic adapted for anilox machining.

6. An anilox roller body as recited in claim 3, wherein:
the metal sleeve is joined to the carbon fiber tube by shrink fitting.

7. An anilox roller body as recited in claim 6, wherein:
said metal sleeve external surface is coated with a ceramic adapted for anilox machining.

8. An anilox roller body as recited in claim 3, wherein:
the metal sleeve is joined to the carbon fiber tube by adhesive bonding.

9. An anilox roller body as recited in claim 8, wherein:
said metal sleeve external surface is coated with a ceramic adapted for anilox machining.

* * * * *